United States Patent
Dobbins

(10) Patent No.: US 6,318,653 B1
(45) Date of Patent: Nov. 20, 2001

(54) ELECTRIC FISHING SET

(76) Inventor: Andre R. Dobbins, 1031 S. State Rd. 37, English, IN (US) 47118-6700

( * ) Notice: Subject to any disclaimer, the term of this patent is extended or adjusted under 35 U.S.C. 154(b) by 0 days.

(21) Appl. No.: 09/553,730

(22) Filed: Apr. 20, 2000

(51) Int. Cl.[7] ............................................. A01K 89/012
(52) U.S. Cl. ........................................... 242/225; 43/26.1
(58) Field of Search .................................. 242/225, 323; 43/21, 26.1, 54.1

(56) References Cited

U.S. PATENT DOCUMENTS

| | | |
|---|---|---|
| 4,515,324 | 5/1985 | Barton . |
| 4,634,072 | 1/1987 | Stealy . |
| 4,638,585 | 1/1987 | Korte ................................. 43/26.1 |
| 4,739,944 | 4/1988 | Atwell ............................. 242/84.1 |
| 5,004,181 | 4/1991 | Fowles ............................. 242/225 |
| 5,088,657 | 2/1992 | Chen ................................. 242/225 |
| 5,473,835 | * 12/1995 | Emett ................................. 43/26.1 |
| 6,056,219 | * 5/2000 | Barkley ........................... 242/225 |
| 6,126,104 | * 3/1964 | Kellerman ....................... 242/225 |
| 6,220,538 | * 4/2001 | Durso ............................... 242/225 |

* cited by examiner

*Primary Examiner*—Emmanuel M. Marcelo
(74) *Attorney, Agent, or Firm*—Richard L. Miller

(57) ABSTRACT

An electric fishing set that includes a handle that replaceably holds an electric prime mover, a fishing pole that extends from the handle, a spinning reel that is attached to the handle, and a transmission that is operatively connected to the spinning reel and the electric prime mover. The handle includes an upper tube that contains the prime mover and a lower tube that depends from, and extends axially along, the upper tube and holds the fishing pole. The spinning reel includes a crank that has a shaft and a pin that is externally threaded and extends coaxially outwardly from the shaft. The electric prime mover is a portable electric screwdriver. The transmission includes a shaft that has a hexagonal lateral cross section and a flexible drive cable that has a first end with a sleeve thereon that is internally threaded and threadably receives the pin of the spinning reel and a second end with a sleeve thereon that contains an axial blindbore that has an hexagonal lateral cross section and which slidably receives the shaft of the transmission.

22 Claims, 1 Drawing Sheet

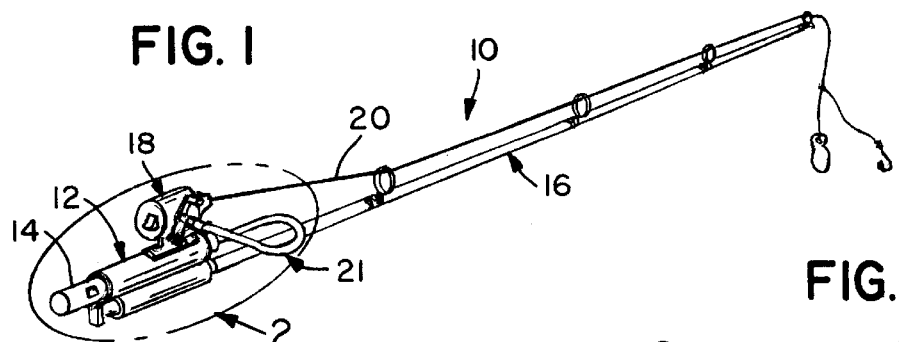
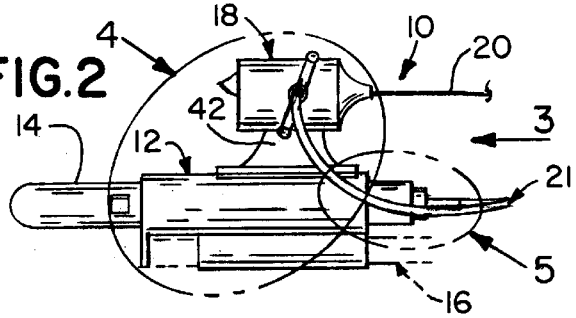
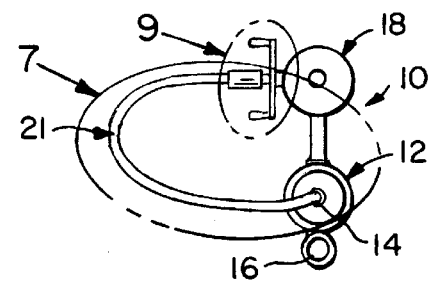
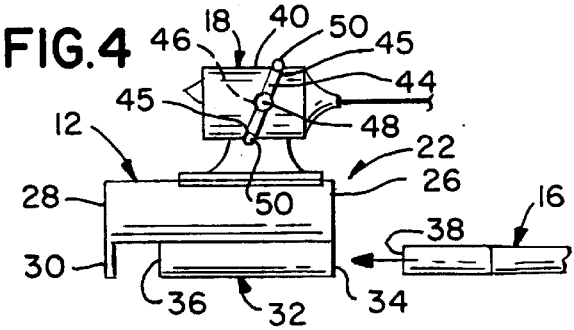
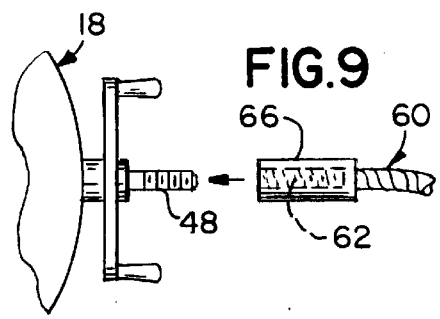
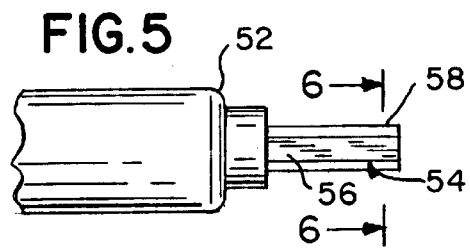
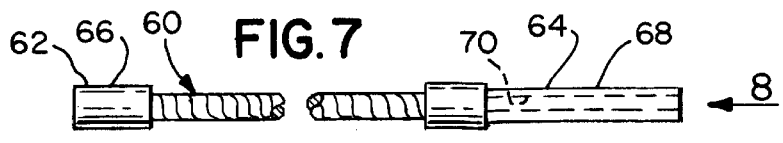
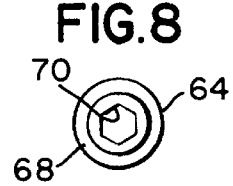

ELECTRIC FISHING SET

BACKGROUND OF THE INVENTION

1. Field of the Invention

The present invention relates to a fishing set. More particularly, the present invention relates to an electric fishing set.

2. Description of the Prior Art

Numerous innovations for electric fishing related devices have been provided in the prior art that will be described. Even though these innovations may be suitable for the specific individual purposes to which they address, however, they differ from the present invention.

A FIRST EXAMPLE, U.S. Pat. No. 4,515,324 to Barton teaches a portable hand held type fishing reel having a motor operably connected with the spool member of the reel for facilitating winding of the fishing line onto the spool without interference with the normal operation of the fishing reel, the motor being operably connected with a switch by a battery pack which may be remotely disposed with respect to the reel, a drive assembly connected with the spool member and selectively operable upon energization of the motor for winding of the line onto the spool, the drive assembly including a pivotal lever having a normal position wherein the drive connection between the motor and spool is disengaged and selectively movable to provide an engaged position between the motor and spool, the lever being particularly designed whereby the driving engagement between the motor and spool is achieved prior to energization of the motor to substantially preclude accidental damage of the engaged driving elements.

A SECOND EXAMPLE, U.S. Pat. No. 4,634,072 to Stealy teaches a fishing reel having a drive motor, gearing, stationary spool for the fishing line and a flanged winding cup provided with a guide for a pickup pin extendable through the flange, together with a cam for causing the guide and pickup pin to be extended, includes a spring which moves the winding cup toward the cam and produces sufficient force to maintain the guide on the cam against a surge of a fish when the pickup pin is extended to use the gearing and unactuated drive motor as a brake. An optical fiber, terminating adjacent the winding cup flange, transmits an impression of the line moving in front of its end around the winding flange during casting or the pickup pin similarly moving, to a translation device which converts the number of rotations into feet, meters, or the like. Such movement is correlated with the amount of line moved onto or off the spool to compensate for differing diameters of a line loop so wound or unwound. A series of solar cells are mounted on the top of the reel housing or form a portion thereof for producing current to charge the batteries, through a diode which permits flow of current one way only. A variable resistance switch for starting the motor not only regulates the speed and power of the motor for playing a fish but also facilitates causing the motor to turn very slightly in order to cause the pickup guide to climb the cam when, after casting, the resistance of the unactuated motor and gearing to movement of the line is to be utilized for braking purposes.

A THIRD EXAMPLE, U.S. Pat. No. 4,638,585 to Korte teaches a motorized fishing device having a body containing a motor, a power source preferably a battery, and a propeller driven by the motor for propelling the body through the water. A float, preferably a bobber, is attached to the body to stabilize it and keep it afloat while also indicating its position in the water. The body is equipped with means for mounting it to a fishing line to be movable along the line relative thereto upstream of a hook and sinker or other tackle located at the end portion of the line. The body additionally includes a releasable catch for fixing the line relative to the body so that initially, the body will feed out the line off a rod and reel as the body is propelled through the water. The catch may be released either by a striking fish or by the user applying tension to the line. Release of the catch allows direct feel through the line to a hooked fished and also may be to change the depth of the hook and sinker in the water. The body also has a cage about the propeller to protect it from weeds or other vegetation in the water as well as entanglement by the line.

A FOURTH EXAMPLE, U.S. Pat. No. 4,739,944 to Atwell teaches a spinning reel for fishing which is arranged to retrieve the line either by a hand crank or by an electric motor. Either of the alternative drives may be actuated without effect on the other. The entire mechanism including the electric motor and batteries is enclosed in a single casing. Either of the controls for retrieving the line may be used without requiring operation of a preselecting mechanism. The motor drive control of the illustrated embodiment comprises an axially slidable worm wheel driven by the motor and biased to its driving position and which is moved against the bias and out of its driving position by operation of the hand crank.

A FIFTH EXAMPLE, U.S. Pat. No. 5,004,181 to Fowles teaches a cordless electric fishing reel, wherein a conventional fishing pole includes an elongate, hollow handle mounted rearwardly of a fixedly secured fishing reel. The handle includes a selfcontained battery pack aligned with an electric motor wherein the electric motor is cooperative with plural sets of planetary gears which an output shaft of the planetary gear arrangement directed and aligned with a ratchet mechanism. The ratchet mechanism is operative for engagement interiorly of a ratchet sleeve to engage and drive the associated reel for rewinding of the fishing line associated with the reel. A pivotally mounted switch mounted on the handle is formed with a medial bore for receiving in a non-binding manner the output of the planetary gear arrangement with an electrical contact arrangement positioned at a lowermost end of the switch for selectively energizing the motor.

A SIXTH EXAMPLE, U.S. Pat. No. 5,088,657 to Chen teaches a motorized spinning reel driving device for fastening in a spinning reel of a fishing rod for taking up a fishing line without changing the original structure of such a spinning reel and fishing rod. The device comprises a housing having received therein a battery case, a motor connected to the battery in the battery case, a reducing gear set mounted on the output end of the motor. A driving shaft is secured to the output end of the reducing gear and protrudes beyond the housing, which driving shaft has a hexagonal conical projection on its rear end so that it can be fastened in the hexagonal hole of a spinning reel of different size.

It is apparent that numerous innovations for electric fishing related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an electric fishing set that avoids the disadvantages of the prior art.

ANOTHER OBJECT of the present invention is to provide an electric fishing set that is simple and inexpensive to manufacture.

STILL ANOTHER OBJECT of the present invention is to provide an electric fishing set that is simple to use.

BRIEFLY STATED, YET ANOTHER OBJECT of the present invention is to provide an electric fishing set that includes a handle that replaceably holds an electric prime mover, a fishing pole that extends from the handle, a spinning reel that is attached to the handle, and a transmission that is operatively connected to the spinning reel and the electric prime mover. The handle includes an upper tube that contains the prime mover and a lower tube that depends from, and extends axially along, the upper tube and holds the fishing pole. The spinning reel includes a crank that has a shaft and a pin that is externally threaded and extends coaxially outwardly from the shaft. The electric prime mover is a portable electric screwdriver. The transmission includes a shaft that has a hexagonal lateral cross section and a flexible drive cable that has a first end with a sleeve thereon that is internally threaded and threadably receives the pin of the spinning reel and a second end with a sleeve thereon that contains an axial blindbore that has an hexagonal lateral cross section and which slidably receives the shaft of the transmission.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention;

FIG. 2 is an enlarged diagrammatic side elevational view of the area generally enclosed by the dotted curve identified by arrow 2 in FIG. 1;

FIG. 3 is a diagrammatic end elevational view taken generally in the direction of arrow 3 in FIG. 2;

FIG. 4 is a diagrammatic side elevational view of the area generally enclosed by the dotted curve identified by arrow 4 in FIG. 2 of the handle, the fishing reel, and the pole being inserted into the handle of the present invention;

FIG. 5 is an enlarged diagrammatic side elevational view of the area generally enclosed by the dotted curve identified by arrow 5 in FIG. 2 of the drive end of the electric prime mover for use with the present invention;

FIG. 6 is a diagrammatic cross sectional view taken on line 6—6 in FIG. 5;

FIG. 7 is an enlarged diagrammatic side elevational view of the area generally enclosed by the dotted curve identified by arrow 7 in FIG. 3 of the transmission of the present invention;

FIG. 8 is an enlarged diagrammatic end elevational view taken generally in the direction of arrow 8 in FIG. 7; and FIG. 9 is an enlarged exploded diagrammatic front elevational view of the area generally enclosed by the dotted curve identified by arrow 9 in FIG. 3 of the connection between the fishing reel and the electric prime mover.

LIST OF REFERENCE NUMERALS UTILIZED IN THE DRAWING 10 electric fishing set of present invention
12 handle for replaceably holding electric prime mover 14
14 electric prime mover
16 fishing pole
18 spinning reel for winding and unwinding fishing line 20 along fishing pole 16
20 fishing line
21 transmission for operatively connecting to electric prime mover 14 and allowing spinning reel 18 to wind and unwind fishing line 20 along fishing pole 16 when electric prime mover 14 is activated.
22 electric prime mover containing-upper tube of handle 12
26 forwardmost end of electric prime mover containing-upper tube 22 of handle 12
28 rearwardmost end of electric prime mover containing-upper tube 22 of handle 12 for allowing electric prime mover 14 to be inserted through rearwardmost end 28 of electric prime mover containing-upper tube 22 of handle 12, with portion thereof extending outwardly therefrom, into electric prime mover containing-upper tube 22 of handle 12, and partially out through forwardmost end 26 of electric prime mover containing-upper tube 22 of handle 12
30 fishing pole-stop of electric prime mover containing-upper tube 22 of handle 12
32 fishing pole containing-lower tube of handle 12
34 forwardmost end of fishing pole containing-lower tube 32 of handle 12
36 rearwardmost end of fishing pole containing-lower tube 32 of handle 12
38 rearwardmost end of fishing pole 16
40 housing of spinning reel 18
42 mount of spinning reel 18
44 crank of spinning reel 18
45 at least one free end of crank 44 of spinning reel 18
46 shaft of spinning reel 18
48 pin of spinning reel 18
50 at least one handle of spinning reel 18 for facilitating rotation of crank 44 of spinning reel 18
52 tool receiving-forwardmost end of electric prime mover 14 for extending partially past forwardmost end 26 of prime mover containing-upper tube 22 of handle 12
54 electric prime mover engaging-shaft of transmission 21
56 rearwardmost end of electric prime mover engaging-shaft 54 of transmission 21 for engaging in tool receiving-forwardmost end 52 of electric prime mover 14
58 forwardmost end of electric prime mover engaging-shaft 54 of transmission 21 for extending forwardly and axially of tool receiving-forwardmost end 52 of electric prime mover 14
60 flexible drive cable of transmission 21
62 first end of flexible drive cable 60 of transmission 21
64 second end of flexible drive cable 60 of transmission 21
66 spinning reel engaging-sleeve on first end 62 of flexible drive cable 60 of transmission 21
68 electric prime mover engaging-sleeve on second end 64 of flexible drive cable 60 of transmission 21
70 axial blindbore in electric prime mover engaging-sleeve 68 on second end 64 of flexible drive cable 60 of transmission 21

DETAILED DESCRIPTION OF THE PREFERRED EMBODIMENT

Referring now to the figures, in which like numerals indicate like parts, and particularly to FIG. 1, the electric fishing set of the present invention is shown generally at 10.

The overall configuration of the electric fishing set 10 can best be seen in FIGS. 1–3, and as such, will be discussed with reference thereto.

The electric fishing set 10 comprises a handle 12 for replaceably holding an electric prime mover 14 that has a diameter.

The electric fishing set 10 further comprises a fishing pole 16 that extends from the handle 12.

The electric fishing set 10 further comprises a spinning reel 18 that is attached to the handle 12 for winding and unwinding a fishing line 20 along the fishing pole 16.

The electric fishing set 10 further comprises a transmission 21 that is operatively connected to the spinning reel 18 for operatively connecting to the electric prime mover 14 and allowing the spinning reel 18 to wind and unwind the fishing line 20 along the fishing pole 16 when the electric prime mover 14 is activated.

The specific configurations of the handle 12, the fishing pole 16, and the spinning reel 18 can best be seen in FIG. 4, and as such, will be discussed with reference thereto.

The handle 12 comprises an electric prime mover containing-upper tube 22 that has a constant diameter, a forwardmost end 26 that is open, and a rearwardmost end 28 that is open for allowing the electric prime mover 14 to be inserted through the rearwardmost end 28 of the electric prime mover containing-upper tube 22 of the handle 12, with a portion thereof extending outwardly therefrom, into the electric prime mover containing-upper tube 22 of the handle 12, and partially out through the forwardmost end 26 of the electric prime mover containing-upper tube 22 of the handle 12.

The electric prime mover containing-upper tube 22 of the handle 12 further has a fishing pole-stop 30 that depends coplanarly from, and extends a distance from, the rearwardmost end 28 thereof.

The handle 12 further has a fishing pole containing-lower tube 32 that depends from, and extends axially along, the electric prime mover containing-upper tube 22 of the handle 12.

The fishing pole containing-lower tube 32 of the handle 12 has a constant diameter and a forwardmost end 34 that is open and coplanar with the forwardmost end 26 of the electric prime mover containing-upper tube 22 of the handle 12.

The fishing pole containing-lower tube 32 of the handle 12 further has a rearwardmost end 36 that is open and terminates short of the fishing pole-stop 30 of the electric prime mover containing-upper tube 22 of the handle 12.

The diameter of the electric prime mover containing-upper tube 22 of the handle 12 is sized for snugly containing the electric prime mover 14, while the diameter of the fishing pole containing-lower tube 32 of the handle 12 is sized to snugly receive the fishing pole 16.

The diameter of the electric prime mover containing-upper tube 22 of the handle 12 is larger than the diameter of the fishing pole containing-lower tube 32 of the handle 12 because the diameter of the electric prime mover 14 is larger than the diameter of the fishing pole 16.

The fishing pole 16 is slender, elongated, and has a rearwardmost end 38 that is inserted through the forwardmost end 34 of the fishing pole containing-lower tube 32 of the handle 12, into the fishing pole containing-lower tube 32 of the handle 12, and up against the fishing pole-stop 30 of the electric prime mover containing-upper tube 22 of the handle 12, and has a diameter.

The fishing pole-stop 30 of the electric prime mover containing-upper tube 22 of the handle 12 extends the distance equal to the diameter of the rearwardmost end 38 of the fishing pole 16 for preventing a user holding the handle 12 from cutting self on the fishing pole-stop 30 of the electric prime mover containing-upper tube 22 of the handle 12, by virtue of the fishing pole-stop 30 of the electric prime mover containing-upper tube 22 of the handle 12 being flush with the rearwardmost end 38 of the fishing pole 16.

The spinning reel 18 comprises a housing 40 that extends above, and axially along, the electric prime mover containing-upper tube 22 of the handle 12.

The spinning reel 18 further comprises a mount 42 that depends from and attaches the housing 40 of the spinning reel 18 to the electric prime mover containing-upper tube 22 of the handle 12.

The spinning reel 18 further comprises a crank 44 that has at least one free end 45 and extends outwardly from, and is rotatably mounted relative to, a side of the housing 40 of the spinning reel 18, by a shaft 46 that extends perpendicularly to the crank 44 of the spinning reel 18 for rotation therewith, and has a diameter.

The spinning reel 18 further comprises a pin 48 that is externally threaded and extends coaxially outwardly from the shaft 46 of the handle 44 of the spinning reel 18, and has a diameter.

The diameter of the shaft 46 of the crank 44 of the spinning reel 18 is larger than the diameter of the pin 48 of the spinning reel 18.

The spinning reel 18 further comprises at least one handle 50 that is rotatably attached to the at least one free end 45 of the crank 44 of the spinning reel 18, respectively, for facilitating rotation of the crank 44 of the spinning reel 18.

The configuration of the electric prime mover 14 can best be seen in FIG. 5, and as such, will be discussed with reference thereto.

The electric prime mover 14 is a portable electric screwdriver, for example, one manufactured by Black and Decker, and has a tool receiving-forwardmost end 52 for extending partially past the forwardmost end 26 of the prime mover containing-upper tube 22 of the handle 12.

The specific configuration of the transmission 21 can best be seen in FIGS. 5–9, and as such, will be discussed with reference thereto.

The transmission 21 comprises an electric prime mover engaging-shaft 54 that has a constant lateral cross section, a rearwardmost end 56 for engaging in the tool receiving-forwardmost end 52 of the electric prime mover 14, and a forwardmost end 58 for extending forwardly and axially of the tool receiving-forwardmost end 52 of the electric prime mover 14.

The constant lateral cross section of the electric prime mover engaging-shaft 54 of the transmission 21 is hexagonal to maintain rotational engagement.

The transmission 21 further comprises a flexible drive cable 60 that has a first end 62 and a second end 64.

The first end 62 of the flexible drive cable 60 of the transmission 21 has a spinning reel engaging-sleeve 66 thereon that is internally threaded and threadably receives the pin 48 of the spinning reel 18 for rotation therewith.

The second end 64 of the flexible drive cable 60 of the transmission 21 has an electric prime mover engaging-sleeve 68 thereon that contains an axial blindbore 70 that has a lateral cross section that is hexagonal and which receives the forwardmost end 58 of the electric prime mover engaging-shaft 54 of the transmission 21 for rotation therewith.

The axial blindbore 70 in the electric prime mover engaging-sleeve 68 on the second end 64 of the flexible drive cable 60 of the transmission 21 slidably receives the forwardmost end 58 of the electric prime mover engaging-shaft 54 of the transmission 21 so as to prevent twisting of the flexible drive cable 60 of the transmission 21 when installing.

It will be understood that each of the elements described above, or two or more together, may also find a useful application in other types of constructions differing from the types described above.

While the invention has been illustrated and described as embodied in an electric fishing set, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electric fishing set, comprising:
   A) a handle for replaceably holding an electric prime mover having a diameter and a tool receiving forwardmost end;
   B) a fishing pole extending from said handle;
   C) a spinning reel attached to said handle for winding and unwinding a fishing line along said fishing pole; and
   D) a transmission operatively connected to said spinning reel for operatively connecting to the electric prime mover and allowing said spinning reel to wind and unwind the fishing line along said fishing pole when said electric prime mover is activated, wherein said handle comprises an electric prime mover containing-upper tube that has:
      a) a constant diameter;
      b) a forwardmost end that is open; and
      c) a rearwardmost end that is open for allowing the electric prime mover to be inserted through said rearwardmost end of said electric prime mover containing-upper tube of said handle, with a portion thereof extending outwardly therefrom, into said electric prime mover containing-upper tube of said handle, and partially out through said forwardmost end of said electric prime mover containing-upper tube of said handle.

2. The set as defined in claim 1, wherein said electric prime mover containing-upper tube of said handle further has a fishing pole-stop that depends coplanarly from, and extends a distance from, said rearwardmost end thereof.

3. The set as defined in claim 2, wherein said handle further has a fishing pole containing-lower tube that depends from, and extends axially along, said electric prime mover containing-upper tube of said handle.

4. The set as defined in claim 3, wherein said fishing pole containing-lower tube of said handle has:
   a) a constant diameter; and
   b) a forwardmost end that is open and coplanar with said forwardmost end of said electric prime mover containing-upper tube of said handle.

5. The set as defined in claim 4, wherein said diameter of said electric prime mover containing-upper tube of said handle is sized for snugly containing said electric prime mover, while said diameter of said fishing pole containing-lower tube of said handle is sized to snugly receive said fishing pole.

6. The set as defined in claim 4, wherein said diameter of said electric prime mover containing-upper tube of said handle is larger than said diameter of said fishing pole containing-lower tube of said handle because the diameter of the electric prime mover is larger than said diameter of said fishing pole.

7. The set as defined in claim 4, wherein said fishing pole is slender, elongated, and has a rearwardmost end that is inserted through said forwardmost end of said fishing pole containing-lower tube of said handle, into said fishing pole containing-lower tube of said handle, and up against said fishing pole-stop of said electric prime mover containing-upper tube of said handle, and has a diameter.

8. The set as defined in claim 7, wherein said fishing pole-stop of said electric prime mover containing-upper tube of said handle extends said distance equal to said diameter of said rearwardmost end of said fishing pole for preventing a user holding said handle from cutting self on said fishing pole-stop of said electric prime mover containing-upper tube of said handle, by virtue of said fishing pole-stop of said electric prime mover containing-upper tube of said handle being flush with said rearwardmost end of said fishing pole.

9. The set as defined in claim 3, wherein said fishing pole containing-lower tube of said handle has a rearwardmost end that is open and terminates short of said fishing pole-stop of said electric prime mover containing-upper tube of said handle.

10. The set as defined in claim 1, wherein said spinning reel comprises a housing that extends above, and axially along, said electric prime mover containing-upper tube of said handle.

11. The set as defined in claim 10, wherein said spinning reel further comprises a mount that depends from and attaches said housing of said spinning reel to said electric prime mover containing-upper tube of said handle.

12. The set as defined in claim 10, wherein said spinning reel further comprises a crank that has at least one free end and extends outwardly from, and is rotatably mounted relative to, a side of said housing of said spinning reel, by a shaft that extends perpendicularly to said crank of said spinning reel for rotation therewith, and has a diameter.

13. The set as defined in claim 12, wherein said spinning reel further comprises a pin that is externally threaded and extends coaxially outwardly from said shaft of said crank of said spinning reel, and has a diameter.

14. The set as defined in claim 13, wherein said diameter of said shaft of said crank of said spinning reel is larger than said diameter of said pin of said spinning reel.

15. The set as defined in claim 13, wherein the electric prime mover is a portable electric screwdriver whose tool receiving-forwardmost end is for extending partially past said forwardmost end of said prime mover containing-upper tube of said handle.

16. The set as defined in claim 15, wherein said transmission comprises an electric prime mover engaging-shaft that has:
   a) a constant lateral cross section;
   b) a rearwardmost end for engaging in the tool receiving-forwardmost end of the electric prime mover; and
   c) a forwardmost end for extending forwardly and axially of the tool receiving-forwardmost end of the electric prime mover.

17. The set as defined in claim 16, wherein said constant lateral cross section of said electric prime mover engaging-shaft of said transmission is hexagonal to maintain rotational engagement.

18. The set as defined in claim 16, wherein said transmission further comprises a flexible drive cable that has:

a) a first end; and b) a second end.

19. The set as defined in claim 18, wherein said first end of said flexible drive cable of said transmission has a spinning reel engaging-sleeve thereon that is internally threaded and threadably receives said pin of said spinning reel for rotation therewith.

20. The set as defined in claim 18, wherein said second end of said flexible drive cable of said transmission has an electric prime mover engaging-sleeve thereon that contains an axial blindbore that has a lateral cross section that is hexagonal and which receives said forwardmost end of said electric prime mover engaging-shaft of said transmission for rotation therewith.

21. The set as defined in claim 20, wherein said axial blindbore in said electric prime mover engaging-sleeve on said second end of said flexible drive cable of said transmission slidably receives said forwardmost end of said electric prime mover engaging-shaft of said transmission so as to prevent twisting of said flexible drive cable of said transmission when installing.

22. The set as defined in claim 12, wherein said spinning reel further comprises at least one handle that is rotatably attached to said at least one free end of said crank of said spinning reel, respectively, for facilitating rotation of said crank of said spinning reel.

* * * * *